(12) United States Patent
Napolitano

(10) Patent No.: US 7,183,920 B2
(45) Date of Patent: Feb. 27, 2007

(54) SYSTEM AND METHOD FOR DETECTING ACCESS TO AN ARTICLE OR OPENING OF A PACKAGE

(75) Inventor: Thomas J. Napolitano, East Greenwich, RI (US)

(73) Assignee: Gtech Rhode Island Corporation, Providence, RI (US)

( * ) Notice: Subject to any disclaimer, the term of this patent is extended or adjusted under 35 U.S.C. 154(b) by 200 days.

(21) Appl. No.: 10/931,773

(22) Filed: Aug. 31, 2004

(65) Prior Publication Data
US 2006/0044110 A1   Mar. 2, 2006

(51) Int. Cl.
G08B 13/14   (2006.01)

(52) U.S. Cl. .............................. 340/572.1; 340/539.26; 340/568.1

(58) Field of Classification Search ............. 340/572.1, 340/5.92, 572.8, 539.26, 539.1, 539.22, 568.1; 235/375
See application file for complete search history.

(56) References Cited

U.S. PATENT DOCUMENTS

| | | |
|---|---|---|
| 4,793,489 A | 12/1988 | Israel |
| 5,069,453 A | 12/1991 | Koza et al. |
| 5,112,050 A | 5/1992 | Koza et al. |
| 5,137,135 A | 8/1992 | Pietsch et al. |
| 5,239,165 A | 8/1993 | Novak et al. |
| 5,327,485 A | 7/1994 | Leaden et al. |
| 5,580,311 A | 12/1996 | Haste, III |
| 5,617,812 A | 4/1997 | Balderson et al. |
| 5,681,065 A | 10/1997 | Rua, Jr. et al. |
| 5,770,533 A | 6/1998 | Franchi |
| 5,886,634 A | 3/1999 | Muhme et al. |
| 5,935,000 A | 8/1999 | Sanchez, III et al. |
| 5,949,042 A | 9/1999 | Dietz, II et al. |
| 6,000,725 A | 12/1999 | Nicolosi et al. |
| 6,121,544 A | 9/2000 | Petsinger |
| 6,241,606 B1 | 6/2001 | Riendeau et al. |
| 6,265,973 B1 * | 7/2001 | Brammall et al. ....... 340/568.1 |
| 6,400,272 B1 | 6/2002 | Holtzman et al. |
| 6,628,764 B1 | 9/2003 | Petite |

(Continued)

FOREIGN PATENT DOCUMENTS

FR   2 853 438   10/2004

OTHER PUBLICATIONS

Engles, Daniel W., Technical Memo, A Comparison of the Electronic Product Code Identification Scheme & the Internet Protocol Address Identification Scheme, Auto-Id Center, Massachusetts Institute of Technology, Cambridge, MA 02139-4307, published Jun. 1, 2002.

(Continued)

*Primary Examiner*—Toan N. Pham
(74) *Attorney, Agent, or Firm*—Kenyon & Kenyon LLP

(57) ABSTRACT

A system for detecting access to an article, including an RFID tag, a reader detecting the RFID tag via wireless communication, and a container including conductive material is described. The container encloses the article. The conductive material surrounds the RFID tag and substantially prevents wireless communication between the RFID tag and the reader unless the container is opened. Detection of the RFID tag may indicate that the container has been opened or the article has been accessed. A host computer may be notified of the detection and may receive from the RFID tag information associated with the article for inventory and accounting purposes.

67 Claims, 9 Drawing Sheets

U.S. PATENT DOCUMENTS

| | | |
|---|---|---|
| 6,658,248 B1 | 12/2003 | Lee |
| 6,702,672 B1 | 3/2004 | Angell et al. |
| 6,853,303 B2 * | 2/2005 | Chen et al. .............. 340/573.1 |
| 6,899,621 B2 | 5/2005 | Behm et al. |
| 7,002,472 B2 * | 2/2006 | Stratmoen et al. ..... 340/539.26 |
| 7,017,805 B2 * | 3/2006 | Meehan ...................... 235/381 |
| 2002/0111214 A1 | 8/2002 | Clifton et al. |
| 2002/0119817 A1 | 8/2002 | Behm et al. |
| 2002/0130180 A1 | 9/2002 | Stóbbe |
| 2003/0122670 A1 * | 7/2003 | Stem et al. .............. 340/568.1 |
| 2003/0186734 A1 | 10/2003 | LeMay et al. |
| 2003/0186739 A1 | 10/2003 | Paulsen et al. |
| 2004/0182918 A1 | 9/2004 | Meehan |
| 2004/0204215 A1 | 10/2004 | Meehan et al. |
| 2004/0204222 A1 | 10/2004 | Roberts |
| 2005/0242957 A1 * | 11/2005 | Lindsay et al. .......... 340/572.7 |

OTHER PUBLICATIONS

Sarma, Sanjay, White Paper, Towards the 5¢ Tag, Auto-Id Center, Massachusetts Institute of Technology, Cambridge, MA 02139-4307, published Nov. 1, 2001.

International Search Report dated Jul. 13, 2006, Application No. PCT/US2005/031288, filed Aug. 31, 2005.

U.S. Appl. No. 10/392,618, filed Mar. 19, 2003—copy of application, including specification, claims, abstract and drawings.

U.S. Appl. No. 10/723,410, filed Nov. 24, 2003—copy of application, including specification, claims, abstract and drawings.

* cited by examiner

SYSTEM AND METHOD FOR DETECTING ACCESS TO AN ARTICLE OR OPENING OF A PACKAGE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

A substantial expenditure of time and resources is associated with restocking and resupplying operations, for example, the loading of articles into a vending machine. In a typical restocking procedure, a package containing an article is brought close to the machine to be resupplied, the package is opened, and the article is loaded into the machine. In many situations it is necessary to keep track of the origin of the articles being loaded, at what time the resupplying occurs, etc. This can be motivated by accounting and billing considerations; or to prevent fraud, unauthorized stock transfer, and the like; or it may be required to allow the operation of the article and/or the vending machine itself. The manual recording of the resupplying event has associated costs, and entails the possibility of errors and delays.

Game ticket vending machines are a good example of the need for tracking such articles in real time. Instant lottery tickets, such as "scratch-off" or "pull-tab" tickets, if valid or activated, may be equivalent to cash. Accordingly, their handling requires extensive safeguarding and careful control, similarly to the handling of currency. To prevent errors and abuse, some types of game tickets must be activated at the time they are loaded into a game ticket vending machine. These tickets are often wholesaled to retailers on a consignment basis; The retailers may be charged for tickets only when they are activated. At the time of loading a set (or "book") of tickets into a vending machine, an operator or retailer may need to transmit the ticket information to a central service or host computer in order to validate the tickets for play. Depending on the particular application and on the level of technical sophistication, the level of detail of the transmitted information may range from a single identifier for an entire "book" of game tickets to detailed information on individual game tickets.

Radio frequency identification (RFID) technology offers an economical way for tracking small items during transportation and storage. An RFID tag is essentially a transmitter that can be embedded in the packaging of an article or in the article itself, and transmit information about the location of the article, its date of manufacture, its origin and destination, etc. The signal transmitted from the RFID tag is received by a reader, usually a larger, fixed radio receiver that in turn may be part of a larger wired or wireless data network. An RFID tag can also receive information from the reader or from other sources (built-in sensors, wired and wireless networks, etc) and store this information in a built-in memory, for example recording events such as shipping, usage, and even tampering.

An RFID tag can be passive, receiving power from the reader through electromagnetic radiation, or active, having its own source of power, for example a battery. Semi-passive RFID tags comprise a source of power for the internal circuitry, but draw power from the reader for radio transmission. In the following, by 'passive RFID tag' we will also denote semi-passive tags.

Possible applications proposed for RFID technology include tracking of containers and rail cars, retail-level packaging, personnel identification and access control. A host of RFID products and applications are being introduced by major semiconductor, computer and software companies. Standards for RFID equipment and communication protocols have been published by ISO (International Standards Organization), IEC (International Electro-Technical Commission) and AIM (Association for Automatic Identification and Mobility).

RFID tags may be used to track articles as they move along the supply chain, by placing readers at key locations, for example in handling and storage facilities. However, accidental transmission may occur during transportation and storage if the RFID tag is for any reason brought too close to a reader which is located at a different stage along the supply chain. For example, an article could be stored in the same location where the article is intended to be used, so that a reader designed to detect the usage of the article could incorrectly detect RFID tags attached to articles being stored, and vice versa. The exact range of communication for RFID technology depends on the power of the RFID tag transmitter and the sensitivity of the reader, as well as on environmental conditions such as bodies causing signal reflections and sources of interference. Therefore, it may be impractical to rely on the RFID tag being in or out of the range of a specific reader.

U.S. Pat. No. 6,628,764 to Petite and U.S. Pat. No. 6,658,248 to Lee describe vending machines using radio communication to interact with the users and/or with the service provider.

U.S. Pat. No. 6,121,544 to Petsinger describes a holder with shielding properties, that may prevent surreptitious access to contactless smartcards.

U.S. Pat. No. 5,617,812 to Balderson et al. and U.S. Pat. No. 4,793,489 to Israel describe the use of diffusion of various types of gas to detect the opening of a container of perishable goods such as food.

Two pending U.S. patent application (application Ser. No. 10/392,618, filed on Mar. 19, 2003, to Meehan; application Ser. No. 10/723,410, filed on Nov. 24, 2003, to Meehan et al.) describe the use of RFID technology in game tickets. These applications are assigned to the owner of the present application.

DETAILED DESCRIPTION OF EXAMPLE EMBODIMENTS

Figure 1:
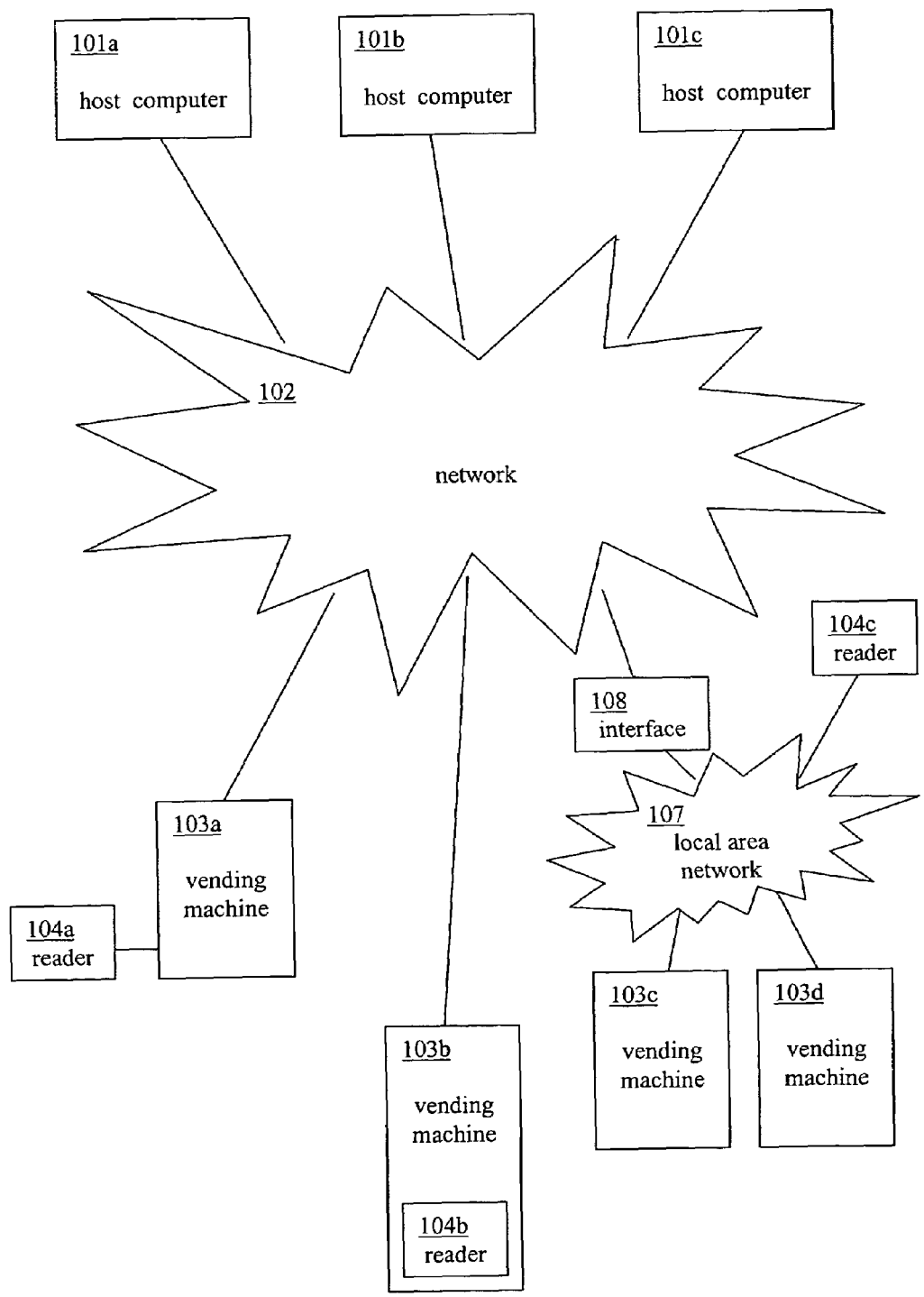
FIG. 1 illustrates an example network-based vending machine system, according to an example embodiment of the present invention.

In one aspect, the invention provides a system for detecting access to an article, including an RFID tag, a reader detecting the RFID tag via wireless communication, and a container including conductive material, the container enclosing the article, the conductive material surrounding the RFID tag and substantially preventing wireless communication between the RFID tag and the reader unless the container is opened. In an example embodiment, the system may also include a memory in the RFID tag, the memory containing information associated with the article, and a memory in the reader, the memory receiving the information associated with the article via wireless communication. In another embodiment, the system may also include a host computer in communication with the reader, the host computer receiving the information associated with the article from the memory in the reader.

The reader may be located in the proximity of a vending machine, for example, outside the vending machine, attached to the vending machine, or inside the vending machine. In another embodiment, the system may include a second reader located inside the vending machine, the second reader detecting the RFID tag only if the RFID tag is placed inside the vending machine.

In an embodiment of the present invention, the article may be a game ticket, for example an instant lottery ticket, and the reader may be located in the proximity of a game ticket vending machine. The information associated with the article may identify the game ticket as being part of a pack of game tickets. In another embodiment, the article may be a pack of game tickets.

The container may include a lining including the conductive material and enclosing both the article and the RFID tag. In different embodiments of the present invention, the lining may include a metal foil, a metallized plastic sheet, or a conductive mesh. In another embodiment, the container may include a package and a sealing element, the package enclosing the article, the sealing element including the conductive material, the sealing element preventing opening of the package unless the sealing element is opened. The sealing element may include two layers of tape containing the conductive material, the RFID tag being positioned between the two layers of tape.

In another example embodiment of the present invention, the container may include a second RFID tag located outside the conductive material, the wireless communication between the second RFID tag and the reader being substantially unaffected by the container being closed or open. The system may also include a memory, the memory storing an indication that the RFID tag has been detected by the reader. The memory may be located in the RFID tag or in the reader.

In another embodiment, the system may also include a host computer in communication with the reader, the host computer being notified by the reader of the detection of the RFID tag by the reader. The system may also include an indicator in communication with the reader to signal the detection of the RFID tag by the reader.

In another aspect, the present invention provides a method for detecting access to an article, including bringing the article into proximity of a reader, the article being enclosed in a container including conducting material, the conductive material surrounding an RFID tag and substantially preventing wireless communication between the RFID tag and the reader, opening the container, after the container is opened, detecting the RFID tag by the reader, and transmitting an indication that the RFID tag has been detected. The method may also include transmitting information associated with the article from the RFID tag to the reader via wireless communication, notifying a host computer in communication with the reader of the detection of the RFID tag, and transmitting the information associated with the article to the host computer. The method may include loading the article into the vending machine.

In one embodiment, the method may include detecting the RFID tag by a second reader located inside the vending machine, the second reader detecting the RFID tag only if the RFID tag is loaded into the vending machine. The method may include detecting a second RFID tag located outside the conductive material, the wireless communication between the second RFID tag and the reader being substantially unaffected by the container being closed or open. The method may also include storing in a memory an indication that the RFID tag has been detected by the reader.

In another aspect, the present invention provides a computer readable medium, storing thereon program instructions that, when executed, cause an executing system to detect an RFID tag, the RFID tag being located in proximity of an article, the detection of the RFID tag being substantially prevented by a container surrounding the RFID tag until the container is opened, the container enclosing an article, and transmit an indication that the RFID tag has been detected and the container has been opened. The medium may also store program instructions that, when executed, further cause an executing system to transmit information associated with the article from the RFID tag via wireless communication, transmit the information associated with the article to a host computer, detect a second RFID tag located outside the conductive material, the detection of the second RFID tag being substantially unaffected by the container being closed or open.

FIG. 1 illustrates an example network-based vending machine system, according to an example embodiment of the present invention. One or more host computers 101a–c may communicate through a network 102. One or more vending machines 103a–d may communicate with the host computers via network 102, sending and receiving information concerning prices, sales, supply and maintenance operations, etc. Examples of vending machines that may be used or adapted for network operation are the Lottery POS Terminals of the Altura family of products, produced by GTech Corp., West Greenwich, R.I.; Instant Ticket Dispensers manufactured by Schafer Systems Inc., Adair, Iowa, and Take-A-Ticket Inc., Albany, Oreg.; Instant Ticket Vending Machines produced by GTech Corp., West Greenwich, R.I., Pollard Banknote Ltd., Winnipeg, Canada, and Scientific Games Corp., New York, N.Y.

Each vending machine 103a–d may be in communication with one or more RFID readers, located outside (104a) or inside (104b) the vending machine. RFID readers may also be configured as stand-alone elements. Stand-alone reader 104c may be connected to a local-area network (LAN) 107. Vending machines 103c–d may also be connected to the LAN 107 and may exchange data with the reader 104c. The LAN 107 may be connected with network 102 through an interface 108, for example a router. Examples of RFID readers that could be used for such applications are the RI-STU-MB2A (Series 2000 Standard Low Frequency Reader with RS-232 Interface), RI-STU-251B (Series 2000 Low Frequency Reader S251B), RR-IDISC-MO2AB-B or RR-IDISC-MO2AB-BA Feig Vicinity/Proximity High Frequency Reader Modules, and RR-IDISC-PR100-A or RR-IDISC-PR-USB Feig High Frequency Proximity Readers, all manufactured by Texas Instruments, Dallas, Tex.; and the MP9111 (125 kHz) and MP9112 (134 kHz) Low-Power, Multi-Protocol Readers, manufactured by SAMSys, Richmond Hill, Ontario, Canada. It should be noted that these particular commercial products are listed by way of example, and commercial applications may use modified versions of these or other manufacturers.

Figure 2:
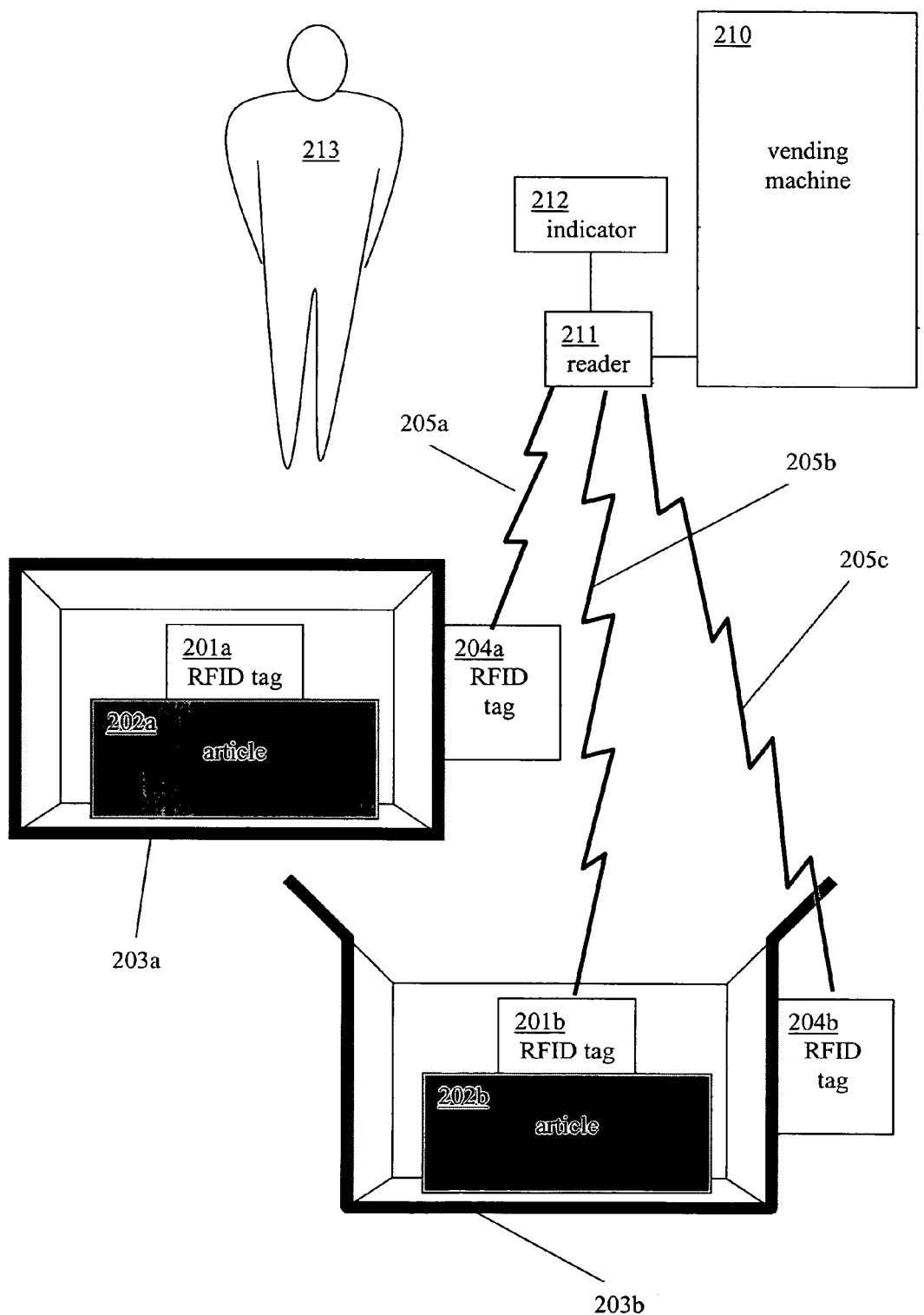
FIG. 2 illustrates an example interaction between a reader and several RFID tags, according to an example embodiment of the present invention.

FIG. 2 illustrates an example interaction between a reader and several RFID tags, according to an example embodiment of the present invention. A vending machine 210 may be in communication with a reader 211. The reader 211 in this example may be located outside the vending machine 210. In this example, two internal RFID tags 201a and 201b may be located in proximity to two articles 202a and 202b, respectively, e.g., attached to the articles or attached to the inside of a package or box containing the articles. Examples of low-cost, passive RFID tags are the RI-I01-110A and RI-I11-110A TagIt HF Inlay products and the RI-TRP-RR2B Glass Transponder, manufactured by Texas Instruments, Dallas, Tex. In this example, for the sake of illustration, two articles are shown. Article 202a is still in storage, while article 202b is being accessed, for example, in order to be loaded into a vending machine. The internal RFID tag 201a and article 202a are enclosed in a container 203a. The container may have electromagnetic shielding properties, substantially blocking electromagnetic radiation at the frequencies of interest for radio communication and preventing the reader from detecting the internal RFID tag. As a secondary effect, in the case of a passive or semi-passive RFID tag the container may also block transmission from the reader to the internal RFID tag, therefore preventing the powering of the RFID tag transmission circuitry. However the container may also be configured to disable an active (fully self-powered) RFID tag by simply blocking transmission coming from the RFID tag.

Container 203a substantially impairs radio communication, preventing the unintentional detection of the internal RFID tag 201a, for example during transportation, handling or storage. Even when the article 202a is stored well within the reception range of the reader 211, the presence of the conductive container 203a may ensure that the internal RFID tag 201a will not be detected as long as the container 203a remains closed.

As illustrated in FIG. 2, a container 203b enclosing the internal RFID tag 201b and article 202b has been opened. Since the shielding properties of the container 203b are substantially reduced by its having been opened, a wireless communication link 205b may be established between reader 211 and the internal RFID tag 201b. The detection of the internal RFID tag 201b by reader 211 may indicate that the article 202b has been accessed.

In the example embodiment illustrated in FIG. 2, two additional external RFID tags 204a and 204b may be located outside containers 203a and 203b, respectively. These external RFID tags may be attached to the outer surface of the containers, for example. The external RFID tags are substantially unaffected by the containers 203a and 203b being closed or open, therefore a wireless communication link 205a may be established between the reader 211 and the external RFID tag 204a for purposes of tracking the location of the article 202a even if the container 203a is closed, for example during storage. Likewise, a wireless communication link 205c may be established between the reader 211 and the external RFID tag 204b before the container 203b is opened. The presence of the external RFID tags 204a and 204b may also provide a check of the integrity of the container. If the reader detects the external RFID tag 201b but not the internal RFID tag 204b, that may be an indication that something is wrong with the container (damage, tampering, etc).

The detection of the internal RFID tag 201b by the reader 211 may trigger a sequence of events suggested by the particular application. In a simple example embodiment, an indicator 212, for example a display element, is located in the vicinity of the reader and in communication with the reader, to provide a user 213 with an indication of the opening of the container. As previously illustrated in FIG. 1, the vending machine or the reader can also notify a host computer of the detection of the internal or external RFID tag through a network.

While the example embodiment in FIG. 2 only illustrates one reader 211 and two internal RFID tags 201a–b, it will be appreciated that any number of readers may be deployed, and that any number of RFID tags may be as simultaneously supported by those readers, detecting many possible combinations of closed and open containers. Since typical interactions between readers and RFID tags occur within milliseconds, a large number of articles may be simultaneously tracked in real time. In the example of a game ticket vending machine, an RFID tag may be associated with each single ticket, or with an entire pack or book of tickets, as described in U.S. patent application Ser. Nos. 10/392,618 and 10/723,410. In either case, a container may enclose any number of RFID tags which may be detected almost simultaneously by the reader at the time the container is opened.

Figure 3:
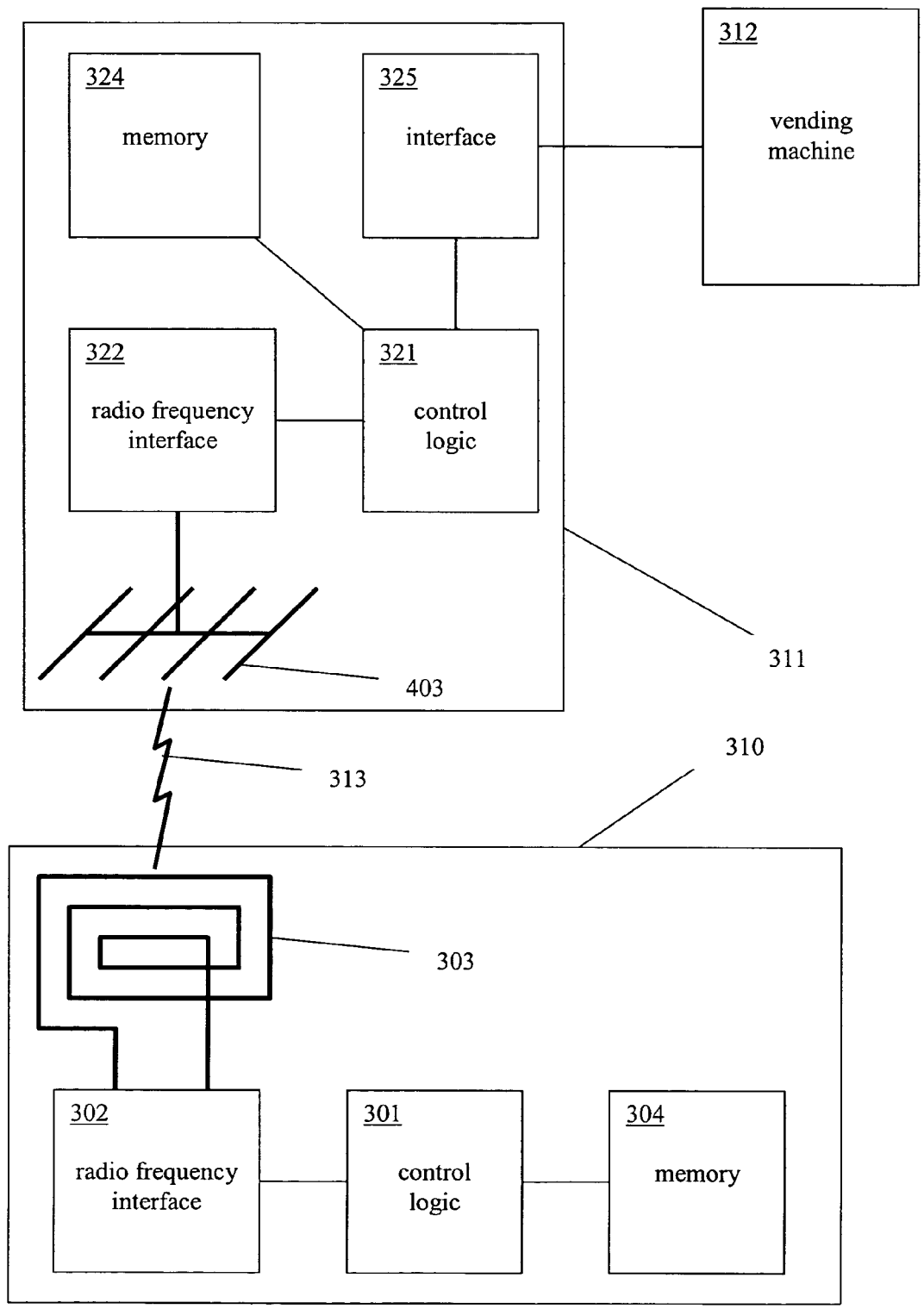
FIG. 3 illustrates an example of communication between an RFID tag and a reader, according to an example embodiment of the present invention.

FIG. 3 illustrates an example of communication between an RFID tag and a reader, according to an example embodiment of the present invention. An RFID tag 310 may include a control logic 301. The control logic 301 may receive and transmit data via a radio frequency interface 302 and an antenna 303. The control logic 301 may also read and write information in a memory 304. Memory 304 may be a semiconductor memory, for example a nonvolatile memory such as a Flash-EEPROM. Elements 301, 302, 303 and 304 may all be fabricated on a single semiconductor chip, or may be physically separate. Memory 304 may contain information associated with an article (not shown) located in proximity of the RFID tag 310, e.g., attached to the RFID tag. In the example of a game ticket, the information stored in memory 304 may include an individual ticket number, or the information may simply identify the game ticket as being part of a particular pack of game tickets. The wireless communication link 313 may enable exchange of information between the RFID tag 310 and a reader 311. Similarly to the RFID tag, the reader 311 may include a control logic 321, which may receive and transmit data via a radio frequency interface 322 and an antenna 323. The control logic 321 may also read and write information in a memory 324. Memory 324 may be a semiconductor memory, for example a DRAM, or a magnetic memory, for example a hard disk.

After the wireless communication link 313 has been established, the contents of the RFID tag memory 304 may be transmitted to the reader memory 324. Additionally, in this example embodiment, the reader 311 may include an interface 325 to a vending machine 312. As illustrated in FIG. 1, the vending machine may forward any information associated with the article to a host computer via a data network: e.g., for inventory, accounting and billing purposes.

While the embodiment illustrated in FIG. 3 refers to a specific arrangement of the elements, the person skilled in the art will understand that other arrangements are possible. In particular, a memory may be included in the system to simply record that the RFID tag has been accessed. This memory may be located for example on the RFID tag itself, or in the reader. Such configuration may provide a simpler way of detecting access to the articles being tracked.

Figure 4:
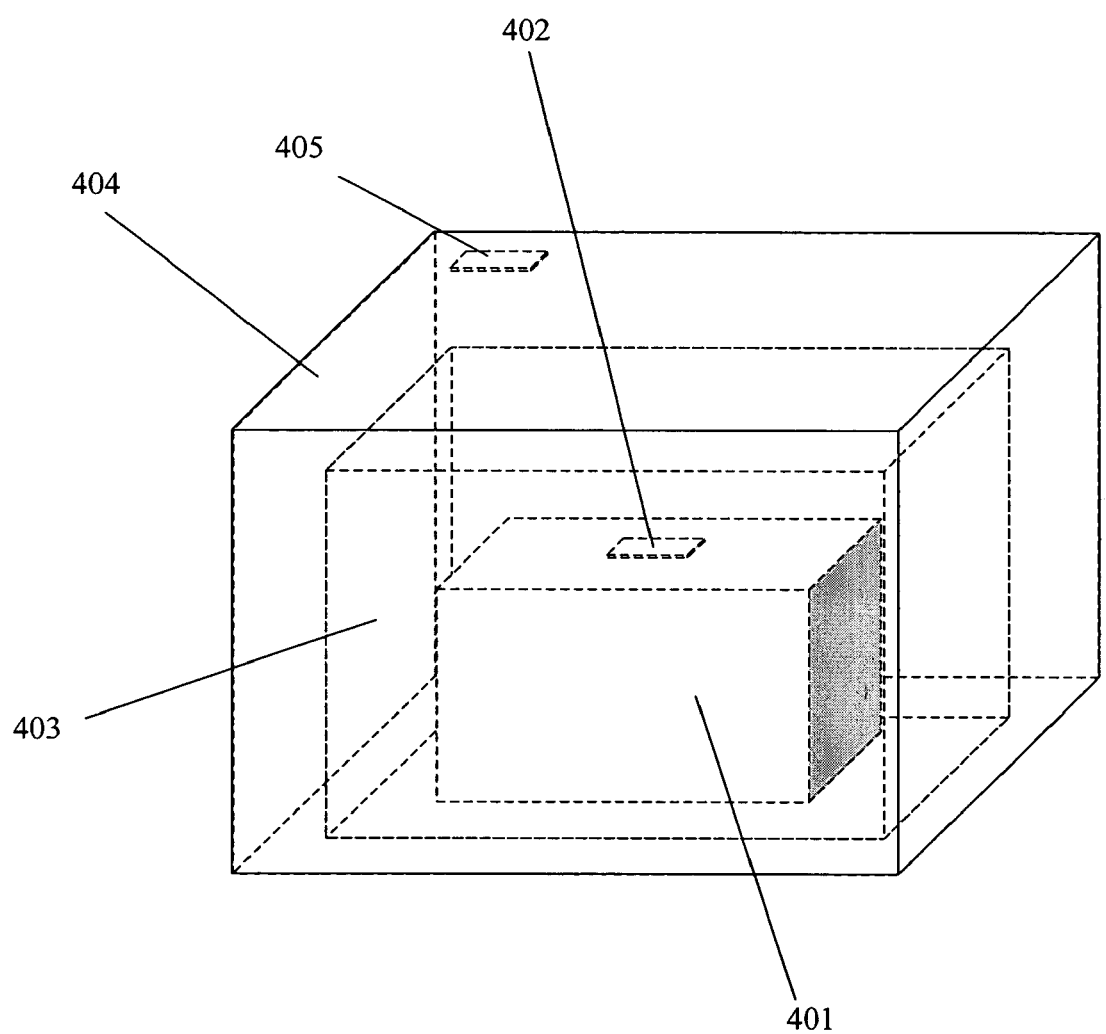
FIG. 4 illustrates an example of physical construction of the system, according to an example embodiment of the present invention.

FIG. 4 illustrates an example of physical construction of the system, according to an example embodiment of the present invention. A package 404, for example made of paper, cardboard or plastic, may be accompanied by a lining 403 which includes a conductive material, for example, a metal. The lining may for example take the form of a metal foil, metallized plastic sheet, etc. The lining may enclose both the article 401 and the internal RFID tag 402. Note that the conductive lining may be placed inside the package, as illustrated in FIG. 4, or outside the package. Also note that the lining need not be sealed or continuous, but the lining may take the form of a mesh or grid, as long as the lining can effectively block electromagnetic radiation at the frequencies of interest for RFID transmission. In this example, an external RFID tag 405 may be located outside the lining, but inside the package, in order to protect the tag from damage.

Figure 5:
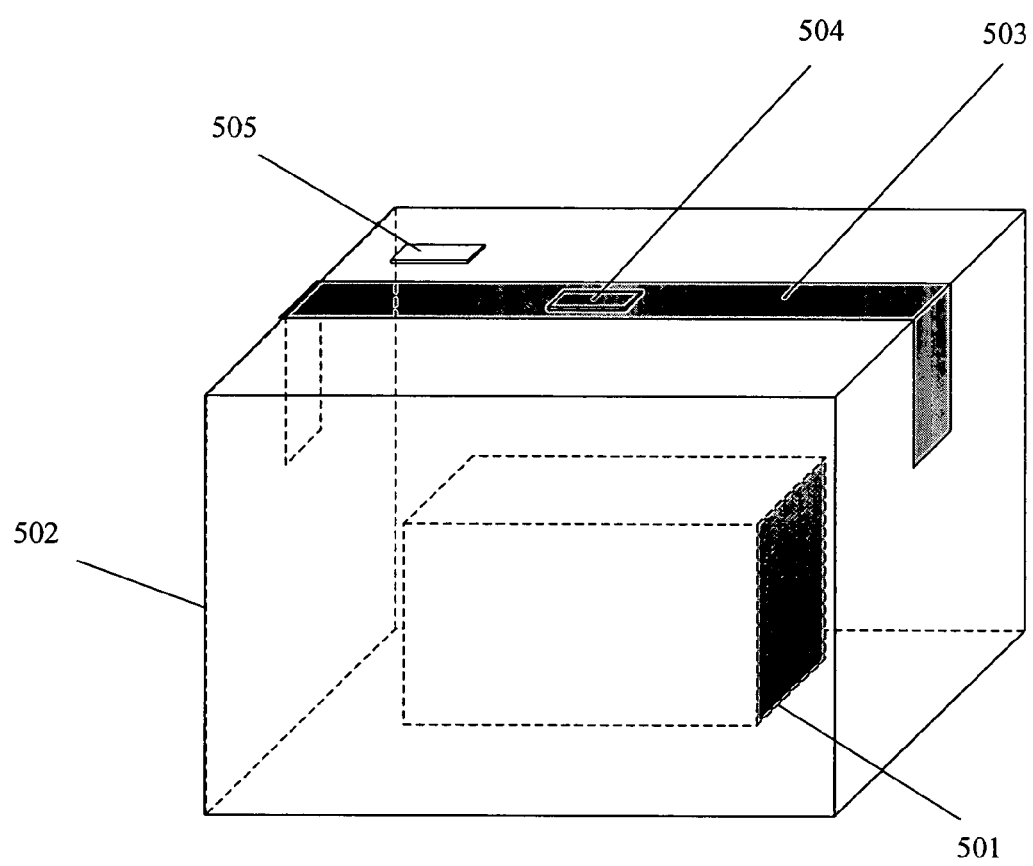
FIG. 5 illustrates an example of physical construction of the system, according to an alternative embodiment of the present invention.

FIG. 5 illustrates an example of physical construction of the system, according to an alternative embodiment of the present invention. An article 501 may be enclosed in a package 502. The package 502 may be made of conventional materials such as paper, cardboard, or plastic. The package 502 may be sealed by a sealing element 503, which may take the form of an adhesive tape. The sealing element 503 may enclose the internal RFID tag 504. The sealing element may have electromagnetic shielding properties. The sealing element may be constructed in such a way that the shielding properties are lost when the seal is opened. The external RFID tag 505 may be also positioned anywhere inside or outside to the package 502, or affixed to the article 501.

Figure 6:
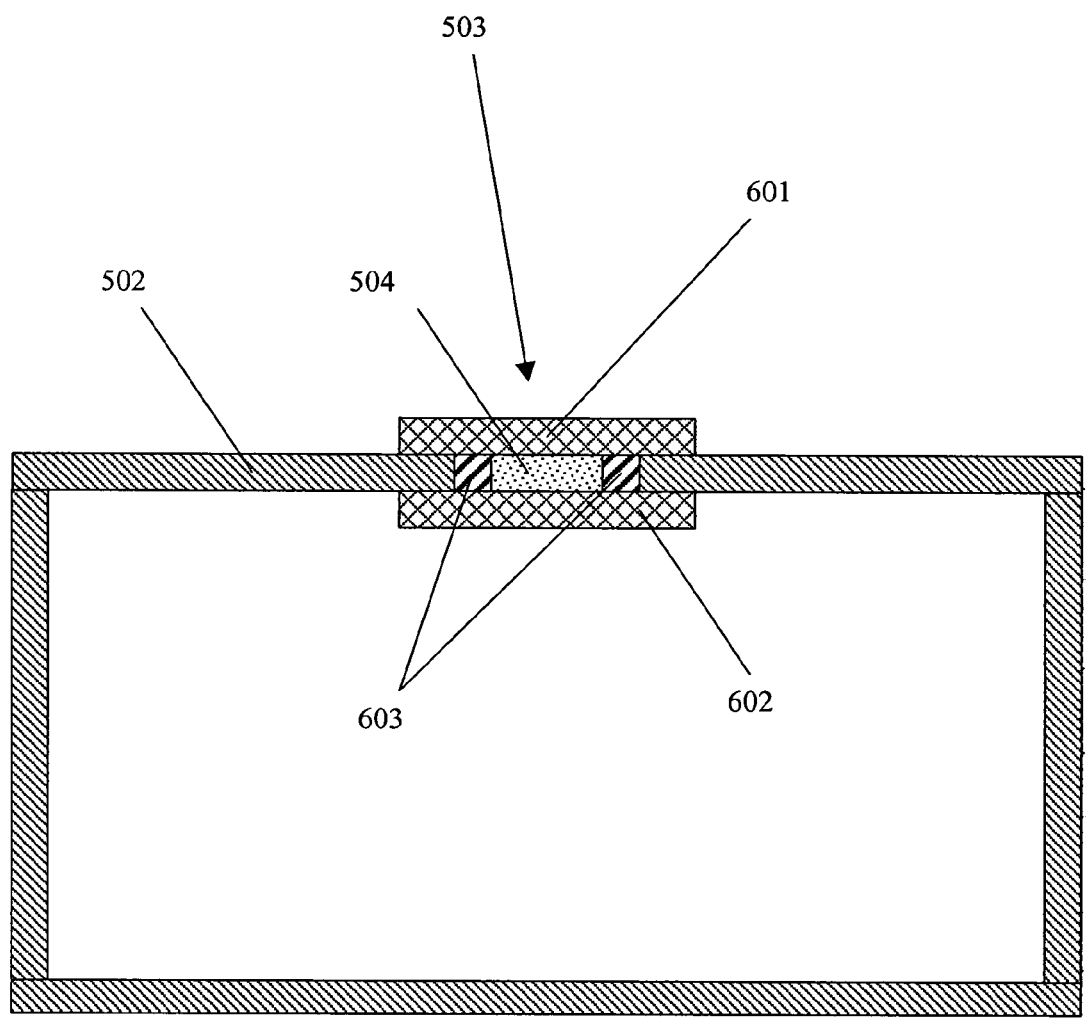
FIG. 6 illustrates an example embodiment of a sealing element.

FIG. 6 illustrates an example embodiment of a sealing element that may be used as an embodiment of element 503 in FIG. 5. FIG. 6 illustrates a cross-section of the package 502 in FIG. 5 and the sealing element 503. In this example, the sealing element 503 may be an adhesive seal joining two walls of the package 502. It will be appreciated that a metallized or conductive sealing element may be advantageously used. The sealing element 503 may take the form of an outer layer 601 and an inner layer 602. Both layers 601 and 602 may be two layers of adhesive tape containing a conductive material, the internal RFID tag 504 being sandwiched between the two layers. A padding element 603 may provide mechanical stability for the seal by filling the gap around the internal RFID tag 504. The container may be opened for example by pulling the layer 601, thus exposing the internal RFID tag 504.

Figure 7:
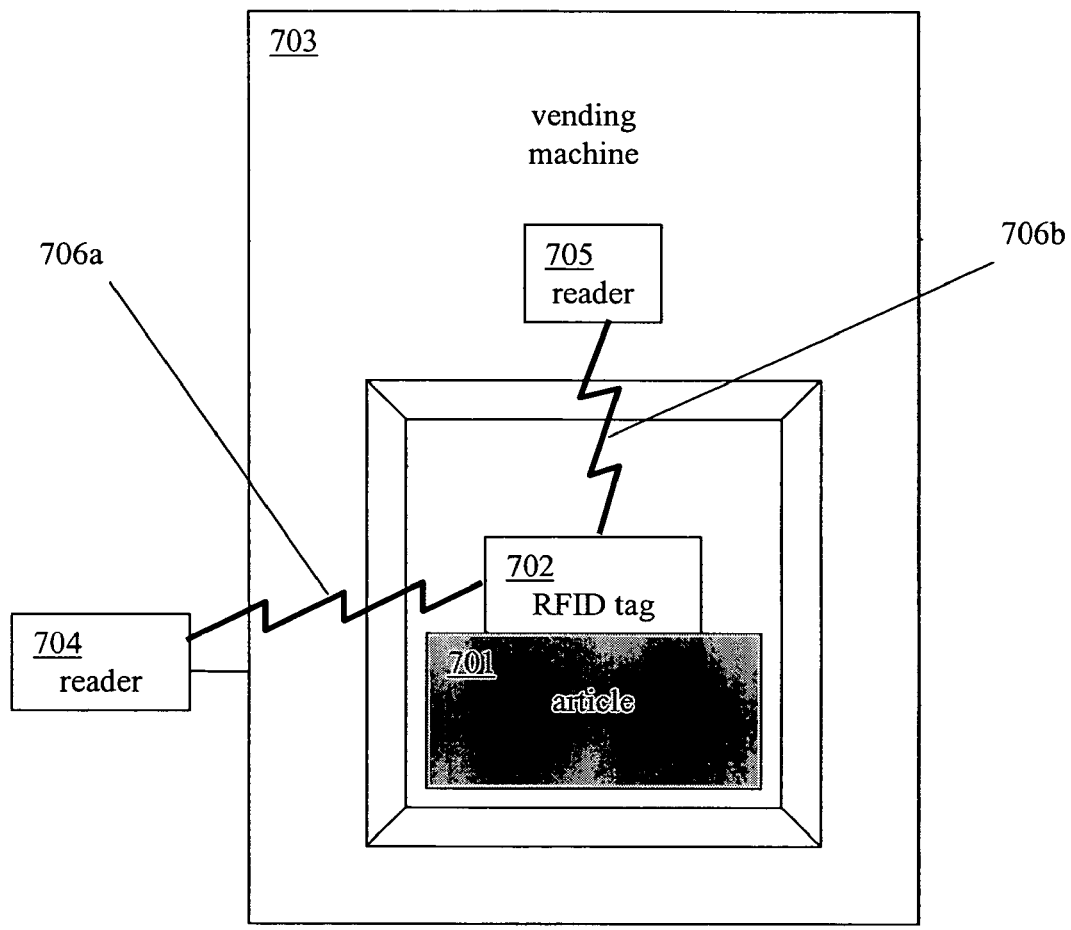
FIG. 7 illustrates an example internal detection feature, according to an example embodiment of the present invention.

FIG. 7 illustrates an example internal detection feature, according to an example embodiment of the present invention. A vending machine 703 may be in communication with an external reader 704. The external reader may be mounted on the exterior of the vending machine, installed as a stand-alone element, or in some other manner. An additional internal reader 705 may also be located inside the vending machine. The internal reader 705 may be configured so that the internal reader will only detect an RFID tag which is located inside the machine, via wireless link 706*b*. The detection can be accomplished, for example, by using a reader with a very short reception range (for example, a few centimeters), or by suitable shielding of the vending machine itself. In this example, an RFID tag 702 may be affixed to the article 701, so that the RFID tag is loaded into the machine along with the article. The detection of the RFID tag 702 by the internal reader 705 may indicate that the article has been loaded into the machine. The vending machine may also transmit information concerning the internal detection to a host computer according to the scheme previously illustrated in FIG. 1. The RFID tag 702 may also establish a wireless link 706*a* with the external reader 704.

Figure 8:
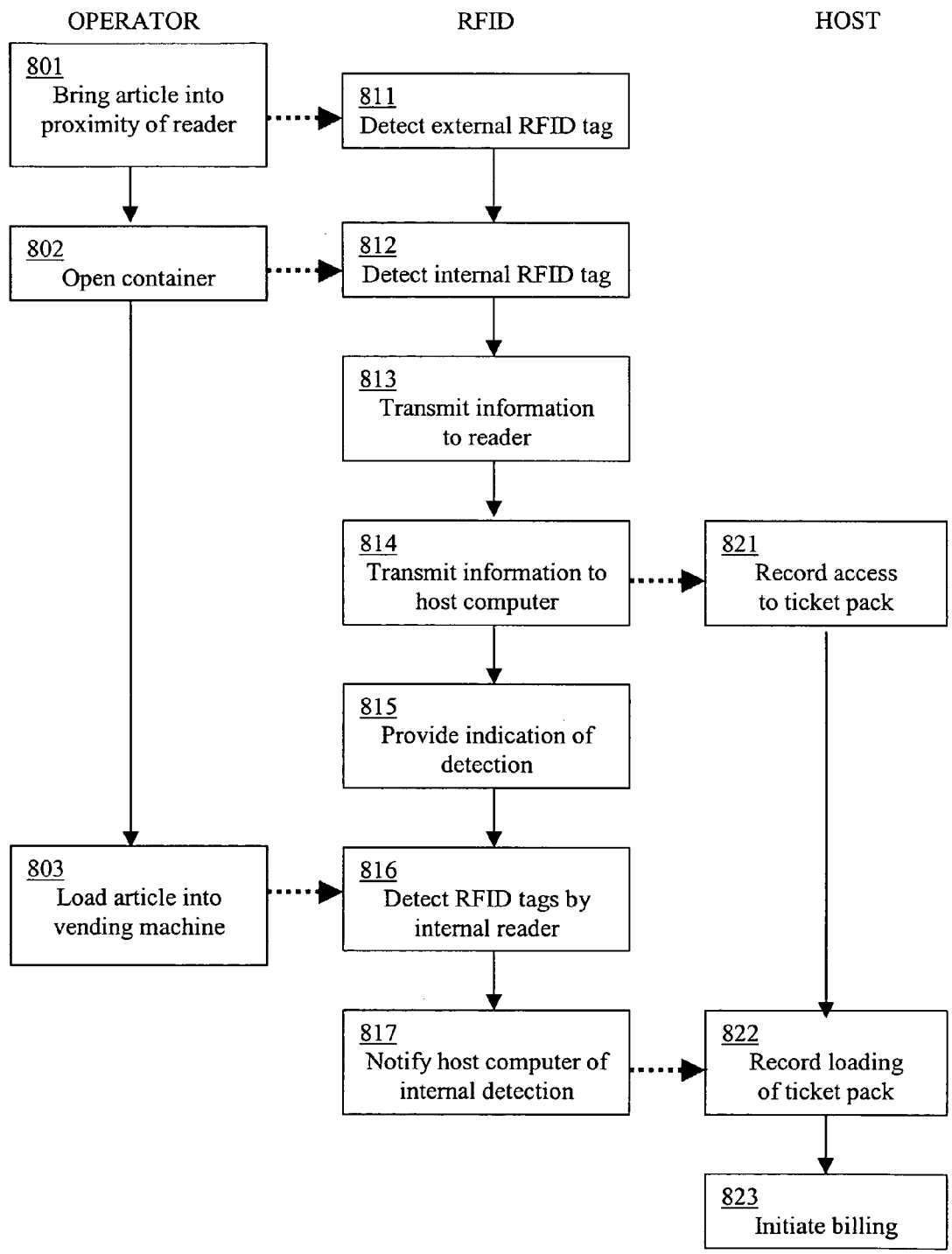
FIG. 8 illustrates an example procedure, according to an example embodiment of the present invention.

FIG. 8 illustrates an example procedure, according to an example embodiment of the present invention. For purposes of illustration only, three correlated flowcharts are illustrated, referring to a vending machine operator, an RFID system, and a host computer. In 801, a container enclosing both an article and an internal RFID tag may be brought into proximity of a reader, for example by an operator. In 811, the external RFID tag may be detected, for example by the reader. In 802 the container may be then opened. Opening the container may enable the reader to detect the internal RFID tag (812). After or during detection, an information associated with the article and stored in an internal RFID tag memory may be transmitted, for example from the internal RFID tag to a reader, and stored for example in a reader memory (813). In 814, the information may be retransmitted, for example from the reader to a host computer. A record may be made, for example by the host computer, of the fact that the article has been accessed, for example, that a pack of lottery tickets has been opened (821). In 815, a user may be notified of the detection of the internal RFID tag via an indication, such as a visual indication. In the exemplary embodiment of the resupplying of a vending machine, the article may be loaded into the vending machine (803). Loading of the article allows detection of the internal RFID tag, the external RFID tag, or both, for example by an internal reader (816). In 817, the internal detection may be transmitted to the host computer. A record may be made, for example by the host computer, of the loading of the ticket pack (822) and billing or other accounting procedure may be initiated (823).

Although FIG. 8 illustrates a specific embodiment of the method, the person skilled in the art will understand that other embodiments are possible, wherein the operations are differently arranged and take place in different elements of the system. For example, part of the reader functionality and the host computer functionality illustrated in FIG. 8 may be implemented in the vending machine itself, if the vending machine is provided with a microprocessor, or in some other piece of equipment in local or remote communication with the other elements. Likewise, some of the reader and the host computer functionalities may be exchanged, for example the reader incorporating a database to record access to the articles, and the host computer including visual means to notify a user of the access to the articles.

Figure 9:
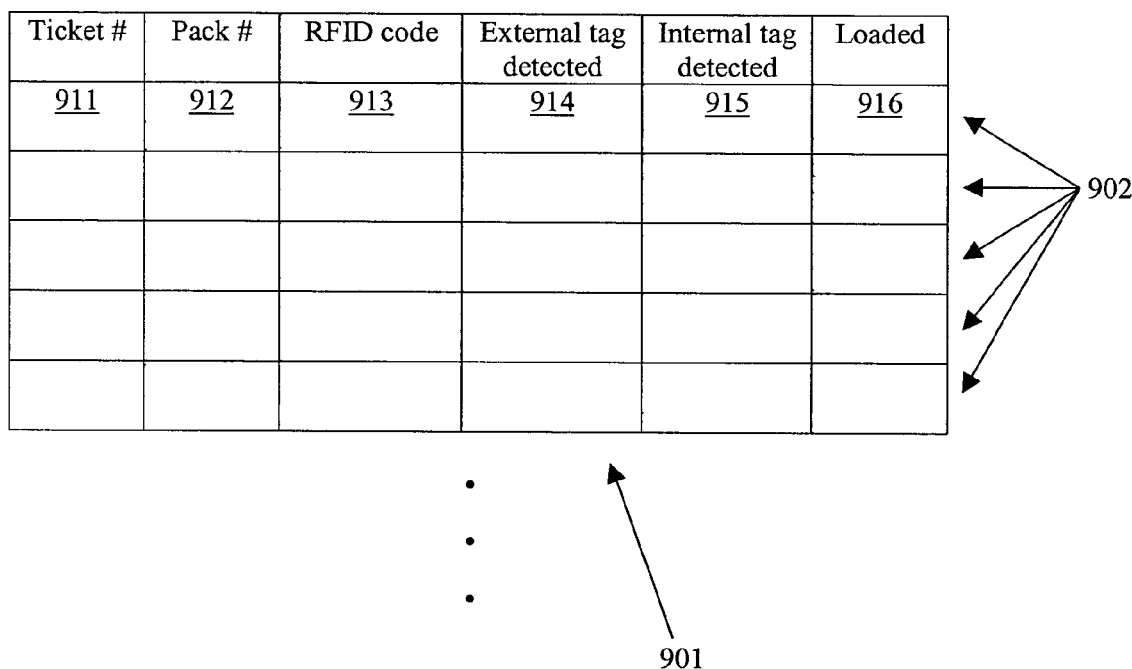
FIG. 9 illustrates an example data structure employed to track articles, according to an example embodiment of the present invention.

FIG. 9 illustrates an example data structure employed to track articles, according to an example embodiment of the present invention. A data structure 901 may include a number of records 902, each comprising a number of fields 903. Fields may include identification information such as the ticket number 911 and pack number 912, and the corresponding RFID code 913. To track the access and loading process, the fields may also include boolean fields such as detection of the external tag 914 (signaling handling of the pack in proximity of the vending machine), detection of the internal tag 915 (signaling opening of the container), and detection by the internal reader 916 (signaling loading of the article into the vending machine). In alternative to boolean values, time stamps may be used, with null values denoting events that haven't occurred, and valid times recording the times of the detection of the external tag, detection of the internal tag, and detection by the internal reader. Other valid data types include numerical counters corresponding to the number of detections, character strings, and all the variants thereof that are known from the art.

The exemplary embodiments of the invention shown here relate to articles used as supplies in vending machines, in particular game tickets to be loaded into game ticket vending machines. However it will be appreciated that the possible embodiments of the invention extend to any type of applications wherein it is desirable to determine in real time which articles have been consumed, loaded, or in general physically accessed. Examples include supplies for office equipment such as printers and copiers (paper, toner and ink cartridges, ribbons, etc.); kegs and bottles for beverage fountains and condiment dispensers in restaurants, bars, and other establishments; etc.

Although the invention has been described in detail including the preferred embodiments thereof, such description is for illustrative purposes only, and it is to be understood that changes and variations including improvements may be made by those skilled in the art without departing from the spirit or scope of the following claims.

What is claimed is:

1. A system for detecting access to an article, comprising:
    an RFID tag;
    a reader located in the proximity of a vending machine, the reader detecting the RFID tag via wireless communication;
    a container including conductive material, the container enclosing the article, the conductive material surrounding the RFID tag and substantially preventing wireless communication between the RFID tag and the reader unless said container is opened;
    a memory in the RFID tag, the memory containing information associated with the article;
    a memory in the reader, the memory receiving the information associated with the article via wireless communication;
    a host computer in communication with the reader, the host computer receiving the information associated with the article from the memory in the reader;
    a second reader located inside the vending machine, the second reader detecting the RFID tag only if the RFID tag is placed inside the vending machine; and
    a second RFID tag located outside the conductive material, the wireless communication between the external RFID tag and the reader being substantially unaffected by the container being closed or open.

2. The system of claim 1, wherein the conductive material is configured to substantially block transmitted radio signals between the RFID tag and the reader.

3. A system for detecting access to an article, comprising:
    an RFID tag;
    a reader detecting the RFID tag via wireless communication; and
    a container including conductive material, the container enclosing the article, the conductive material surrounding the RFID tag and substantially preventing wireless communication between the RFID tag and the reader unless said container is opened.

4. The system of claim 3, further comprising:
    a memory in the RFID tag, the memory containing information associated with the article; and
    a memory in the reader, the memory receiving the information associated with the article via wireless communication.

5. The system of claim 4, further comprising:
    a host computer in communication with the reader, the host computer receiving the information associated with the article from the memory in the reader.

6. The system of claim 4, wherein
    the article is a game ticket, and
    the reader is located in the proximity of a game ticket vending machine.

7. The system of claim 6, wherein
    the information associated with the article identifies the game ticket as being part of a pack of game tickets.

8. The system of claim 6, wherein
    the game ticket is an instant lottery ticket, and
    the game ticket vending machine is an instant lottery ticket vending machine.

9. The system of claim 3, wherein
    the reader is located in the proximity of a vending machine.

10. The system of claim 9, wherein
    the reader is located outside the vending machine.

11. The system of claim 10, wherein
    the reader is attached to the vending machine.

12. The system of claim 9, wherein
    the reader is located inside the vending machine.

13. The system of claim 12, wherein
    the reader is configured to detect the RFID tag only if the RFID tag is placed inside the vending machine.

14. The system of claim 9, further comprising
    a second reader located inside the vending machine, the second reader detecting the RFID tag only if the RFID tag is placed inside the vending machine.

15. The system of claim 3, wherein
    the article is a pack of game tickets, and
    the reader is located in the proximity of a game ticket vending machine.

16. The system of claim 3, wherein the container comprises
    a lining, the lining including the conductive material, the lining enclosing both the article and the RFID tag.

17. The system of claim 16, wherein the lining comprises a metal foil.

18. The system of claim 16, wherein the lining comprises a metallized plastic sheet.

19. The system of claim 16, wherein the lining comprises a conductive mesh.

20. The system of claim 3, wherein the container comprises:
    a package; and
    a sealing element, the package enclosing the article, the sealing element including the conductive material, the sealing element preventing opening of the package unless said sealing element is opened.

21. The system of claim 20, wherein the sealing element comprises:
    two layers of tape containing the conductive material, the RFID tag being positioned between the two layers of tape.

22. The system of claim 3, wherein the container further comprises a second RFID tag located outside the conductive material, the wireless communication between the second RFID tag and the reader being substantially unaffected by the container being closed or open.

23. The system of claim 3, further comprising:
a memory, the memory storing an indication that the RFID tag has been detected by the reader.

24. The system of claim 23, wherein the memory is in the RFID tag.

25. The system of claim 23, wherein the memory is in the reader.

26. The system of claim 3, further comprising a host computer in communication with the reader, the host computer being notified by the reader of the detection of the RFID tag by the reader.

27. The system of claim 3, further comprising an indicator in communication with the reader to signal the detection of the RFID tag by the reader.

28. The system of claim 3, wherein the RFID tag is an active RFID tag.

29. The system of claim 3, wherein the RFID tag is a passive RFID tag.

30. A method for detecting access to an article, comprising:
bringing the article into proximity of a reader, the article being enclosed in a container including conducting material, the conductive material surrounding an RFID tag and substantially preventing wireless communication between the RFID tag and the reader;
opening the container;
after the container is opened, detecting the RFID tag by the reader; and
transmitting an indication that the RFID tag has been detected.

31. The method of claim 30, further comprising:
transmitting information associated with the article from the RFID tag to the reader via wireless communication.

32. The method of claim 31, further comprising:
notifying a host computer in communication with the reader of the detection of the RFID tag, and
transmitting the information associated with the article to the host computer.

33. The method of claim 31, wherein
the article is a game ticket, and
the reader is located in the proximity of a game ticket vending machine.

34. The method of claim 33, wherein
the information associated with the article identifies the game ticket as being part of a pack of game tickets.

35. The method of claim 33, wherein
the game ticket is an instant lottery ticket, and
the game ticket vending machine is an instant lottery ticket vending machine.

36. The method of claim 30, wherein
the reader is located in the proximity of a vending machine.

37. The method of claim 36, further comprising:
loading the article into the vending machine.

38. The method of claim 36, wherein
the reader is located outside the vending machine.

39. The method of claim 38, wherein
the reader is attached to the vending machine.

40. The method of claim 36, wherein
the reader is located inside the vending machine.

41. The method of claim 36, further comprising:
detecting the RFID tag by a second reader located inside the vending machine, the second reader detecting the RFID tag only if the RFID tag is loaded into the vending machine.

42. The method of claim 30, wherein
the article is a pack of game tickets, and
the reader is located in the proximity of a game ticket vending machine.

43. The method of claim 30, wherein the container comprises
a lining, the lining including the conductive material, the lining enclosing both the article and the RFID tag.

44. The method of claim 30, wherein the lining comprises a metal foil.

45. The method of claim 30, wherein the lining comprises a metallized plastic sheet.

46. The method of claim 30, wherein the lining comprises a conductive mesh.

47. The method of claim 30, wherein the container comprises:
a package; and
a sealing element, the package enclosing the article, the sealing element including the conductive material, the sealing element preventing opening of the package unless said sealing element is opened.

48. The method of claim 47, wherein the sealing element comprises:
two layers of tape containing the conductive material, the RFID tag being positioned between the two layers of tape.

49. The method of claim 30, further comprising:
detecting a second RFID tag located outside the conductive material, the wireless communication between the second RFID tag and the reader being substantially unaffected by the container being closed or open.

50. The method of claim 30, further comprising:
storing in a memory an indication that the RFID tag has been detected by the reader.

51. The method of claim 50, wherein the memory is in the RFID tag.

52. The method of claim 50, wherein the memory is in the reader.

53. The method of claim 30, further comprising:
notifying a host computer in communication with the reader of the detection of the RFID tag by the reader.

54. The method of claim 30, further comprising:
signaling the detection of the RFID tag by the reader by an indicator in communication with the reader.

55. The method of claim 30, wherein the RFID tag is an active RFID tag.

56. The method of claim 30, wherein the RFID tag is a passive RFID tag.

57. The method of claim 30, wherein the conductive material is configured to substantially block transmitted radio signals between the RFID tag and the reader.

58. A computer readable medium, storing thereon program instructions that, when executed, cause an executing system to:
detect an RFID tag, the RFID tag being located in proximity of an article, the detection of the RFID tag being substantially prevented by a container surrounding the RFID tag until the container is opened, the container enclosing an article; and
transmit an indication that the RFID tag has been detected and the container has been opened.

59. The computer readable medium of claim 58, storing thereon program instructions that, when executed, further cause an executing system to:
transmit information associated with the article from the RFID tag via wireless communication;

transmit the information associated with the article to a host computer;

detect a second RFID tag located outside the conductive material, the detection of the second RFID tag being substantially unaffected by the container being closed or open.

60. The computer readable medium of claim 58, wherein the container is configured to substantially block transmitted radio signals between the RFID tag and an RFID tag reader.

61. An apparatus, comprising:
at least one lottery ticket having a radio receiving device; and
a container surrounding the at least one lottery ticket and configured to substantially block radio signals transmitted to the radio receiving device prior to the container being opened.

62. The apparatus of claim 61, wherein the container further comprises a conductive material configured to substantially block radio signals transmitted to the radio receiving device prior to the container being opened.

63. The apparatus of claim 61, wherein the at least one lottery ticket further comprises a radio transmitting device configured to transmit a second radio signal responsive to the receipt of a first radio signal by the radio receiving device.

64. The apparatus of claim 63, wherein the radio receiving device and the radio transmitting device are included in an RFID tag.

65. The apparatus of claim 64, wherein the RFID tag is included as part of single lottery ticket.

66. The apparatus of claim 64, wherein the RFID tag is included as part of a book of lottery tickets.

67. The apparatus of claim 64, further comprising a processor configured, responsive to receipt of the second radio signal, to write an indication that the container has been opened.

* * * * *